United States Patent
Kang et al.

(10) Patent No.: US 11,734,800 B2
(45) Date of Patent: Aug. 22, 2023

(54) METHOD AND APPARATUS FOR RESTORING AN IMAGE BY USING A NEURAL NETWORK INCLUDING MULTI-SCALE RESIDUAL BLOCKS

(71) Applicant: SAMSUNG ELECTRONICS CO., LTD., Suwon-si (KR)

(72) Inventors: Deokyoung Kang, Suwon-si (KR); Yang Ho Cho, Seongnam-si (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 113 days.

(21) Appl. No.: 17/346,870

(22) Filed: Jun. 14, 2021

(65) Prior Publication Data
US 2022/0180480 A1 Jun. 9, 2022

(30) Foreign Application Priority Data
Dec. 7, 2020 (KR) .................. 10-2020-0169146

(51) Int. Cl.
*G06T 5/00* (2006.01)
*G06T 3/40* (2006.01)

(52) U.S. Cl.
CPC ............ *G06T 5/001* (2013.01); *G06T 3/4046* (2013.01); *G06T 2207/20084* (2013.01)

(58) Field of Classification Search
CPC ....... G06T 3/40; G06T 3/4007; G06T 3/4046; G06T 3/4053–4076; G06T 5/001–005; G06T 2207/20084; G06N 3/02–088
See application file for complete search history.

(56) References Cited

U.S. PATENT DOCUMENTS

| | | | |
|---|---|---|---|
| 2021/0133920 A1 | 5/2021 | Lee et al. | |
| 2021/0166352 A1 | 6/2021 | Kang et al. | |

FOREIGN PATENT DOCUMENTS

| | | |
|---|---|---|
| CN | 109583345 A | 4/2019 |
| CN | 110120033 A | 8/2019 |
| CN | 110310270 A | 10/2019 |
| CN | 109598728 B | 12/2019 |
| CN | 111242956 A | 6/2020 |

OTHER PUBLICATIONS

Feng, Ruicheng, et al. "Exploring multi-scale feature propagation and communication for image super resolution." arXiv preprint arXiv:2008.00239v2 (2020). (Year: 2020).*

(Continued)

*Primary Examiner* — John B Strege
(74) *Attorney, Agent, or Firm* — Sughrue Mion, PLLC

(57) ABSTRACT

A method for processing an image by using a neural network is provided. The method includes obtaining a target image; and obtaining a restored image corresponding to the target image by using the neural network, the neural network including a plurality of residual blocks connected sequentially. The obtaining the restored image includes obtaining the restored image by performing, in each residual block of the plurality of residual blocks, image processing on an input image, which is input from a previous residual block, on different scales, and providing results of the image processing performed on the different scales to a subsequent residual block.

18 Claims, 13 Drawing Sheets

(56) References Cited

OTHER PUBLICATIONS

Ledig, Christian, et al. "Photo-Realistic Single Image Super-Resolution Using a Generative Adversarial Network." 2017 IEEE Conference on Computer Vision and Pattern Recognition (CVPR). IEEE, 2017. (Year: 2017).*

Esmaeilzehi, Alireza, M. Omair Ahmad, and M. N. S. Swamy. "Mghcnet: A deep multi-scale granular and holistic channel feature generation network for image super resolution." 2020 IEEE International Conference on Multimedia and Expo (ICME). IEEE, 2020. (Year: 2020).*

Hu, Yanting, et al. "Single image super-resolution with multi-scale information cross-fusion network." Signal Processing 179 (2021): 107831. (Year: 2021).*

Li, Juncheng, et al. "Multi-scale Residual Network for Image Super-Resolution." European Conference on Computer Vision. Springer, Cham, 2018. (Year: 2018).*

Zhang, Ziwei, et al. "Shuffle block SRGAN for face image super-resolution reconstruction." Measurement and Control 53.7-8 (2020): 1429-1439. (Year: 2020).*

Lim, B., et al., "Enhanced Deep Residual Networks for Single Image Super-Resolution", CVPRW 2017, pp. 136-144.

Luo, W., et al., "Understanding the Effective Receptive Field in Deep Convolutional Neural Networks", arXiv: 1701.04128v2 [cs.CV], Jan. 25, 2017, 29th Conference on Neural Information Processing Systems (NIPS 2016), pp. 1-9.

Ronneberger, O., et al., "U-Net: Convolutional Networks for Biomedical Image Segmentation", arXiv:1505.04597v1 [cs.CV], May 18, 2015, pp. 1-8.

Giro-I-Nieto., X, et al., "Memory Usage and Computational Considerations", Deep Learning for Computer Vision, Jul. 4-8, 2016, 25 pages.

* cited by examiner

METHOD AND APPARATUS FOR RESTORING AN IMAGE BY USING A NEURAL NETWORK INCLUDING MULTI-SCALE RESIDUAL BLOCKS

CROSS-REFERENCE TO RELATED APPLICATION

This application claims priority from Korean Patent Application No. 10-2020-0169146 filed on Dec. 7, 2020, in the Korean Intellectual Property Office, the disclosure of which is incorporated herein by reference in its entirety.

BACKGROUND

1. Field

Methods and apparatuses consistent with example embodiments relate to image processing.

2. Description of Related Art

The development of an optical technology and an image processing technology has brought the widespread use of capturing devices in various fields such as multimedia contents, security, recognition, and the like. A capturing device may be provided in, for example, a mobile device, a camera, a vehicle, and a computer, to capture an image or obtain data for recognizing an object or controlling such a device. The volume of the capturing device may be determined by the size of a lens, a focal length of the lens, and the size of a sensor. To reduce the volume, a multilens including small lenses may be used.

SUMMARY

One or more example embodiments address at least the above problems and/or disadvantages and other disadvantages not described above. Also, the example embodiments are not required to overcome the disadvantages described above.

According to an aspect of an example embodiment of the disclosure, provided is a method for processing an image by using a neural network, the method being performed by using at least one processor and including: obtaining a target image; and obtaining a restored image corresponding to the target image by using the neural network, the neural network including a plurality of residual blocks connected sequentially, wherein the obtaining the restored image includes obtaining the restored image by performing, in each residual block of the plurality of residual blocks, image processing on an input image, which is input from a previous residual block, on different scales, and providing results of the image processing performed on the different scales to a subsequent residual block.

The providing the results of the image processing may include providing a result of image processing, performed on a corresponding scale in each residual block of the plurality of residual blocks, through a skip connection that is connected to the subsequent residual block on the corresponding scale, and a result of image processing performed on each scale may be used for image processing to be performed on a corresponding scale in the subsequent residual block.

The performing the image processing may include gradually restoring, in each residual block of the plurality of residual blocks, the input image using the input image and the results of the image processing performed on the different scales.

For image processing to be performed on a first scale that refers to a region of a first range of the input image, a result of image processing performed on a second scale that refers to a region of a second range greater than the first range may be used.

A pixel shuffle or upsampling may be performed on the result of the image processing performed on the second scale and a result of the pixel shuffle or the upsampling may be used for the image processing to be performed on the first scale.

The image processing may be performed on the second scale based on a result obtained by performing an inverse pixel shuffle or downsampling on an image to which the image processing on the first scale is to be applied.

The obtaining the restored image may further include performing, in each residual block of the plurality of residual blocks, a normalization operation on a result of a convolution operation in image processing performed on each scale.

A result of image processing performed on each scale may be provided to the subsequent residual block along with the input image to which the image processing on each scale is not applied, to be used for image processing to be performed on a corresponding scale in the subsequent residual block.

A number of the different scales applied to each residual block of the plurality of residual blocks may be determined based on at least one of a size of potential degradation in the target image, a size of a convolution kernel used for the image processing, or a degree of a difference between the different scales.

The target image may correspond to at least one low-resolution image in which degradation occurs, and the restored image may be a high-resolution image in which the degradation is reduced.

The obtaining the target image may include determining the target image based on a plurality of images captured through a multilens array or a plurality of images captured plural times through a single lens.

According to an aspect of an example embodiment of the disclosure, provided is non-transitory computer-readable storage medium storing instructions that are executable by a processor to perform the foregoing method(s).

According to an aspect of an example embodiment of the disclosure, provided is an apparatus for processing an image, the apparatus including: at least one processor configured to obtain a target image, and obtain a restored image corresponding to the target image by using a neural network, the neural network including a plurality of residual blocks connected sequentially, wherein each residual block of the plurality of residual blocks is configured to perform image processing on an input image, which is input from a previous residual block, on different scales, and provide results of the image processing performed on the different scales to a subsequent residual block.

Each residual block of the plurality of residual blocks may be configured to provide a result of image processing performed on a corresponding scale through a skip connection that is connected to the subsequent residual block on the corresponding scale, and a result of image processing performed on each scale may be used for image processing to be performed on a corresponding scale in the subsequent residual block.

Each residual block of the plurality of residual blocks may be configured to gradually restore the input image using the input image and the results of the image processing performed on the different scales.

Each residual block of the plurality of residual blocks may be configured to use, for image processing to be performed on a first scale that refers to a region of a first range of the input image, a result of image processing performed on a second scale that refers to a region of a second range greater than the first range.

Each residual block of the plurality of residual blocks may be configured to perform a normalization operation on a result of a convolution operation in image processing performed on each scale.

Each residual block of the plurality of residual blocks may be configured to provide, to the subsequent residual block, a result of image processing performed on each scale and the input image to which the image processing on each scale is not applied, to be used for image processing to be performed on a corresponding scale in the subsequent residual block.

A number of the different scales applied to each residual block of the plurality of residual blocks may be determined based on a size of potential degradation in the target image, a size of a convolution kernel used for the image processing, or a degree of a difference in the different scales.

The target image may be an image in which a plurality of images captured through a multilens array or a plurality of images captured plural times through a single lens is arranged.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
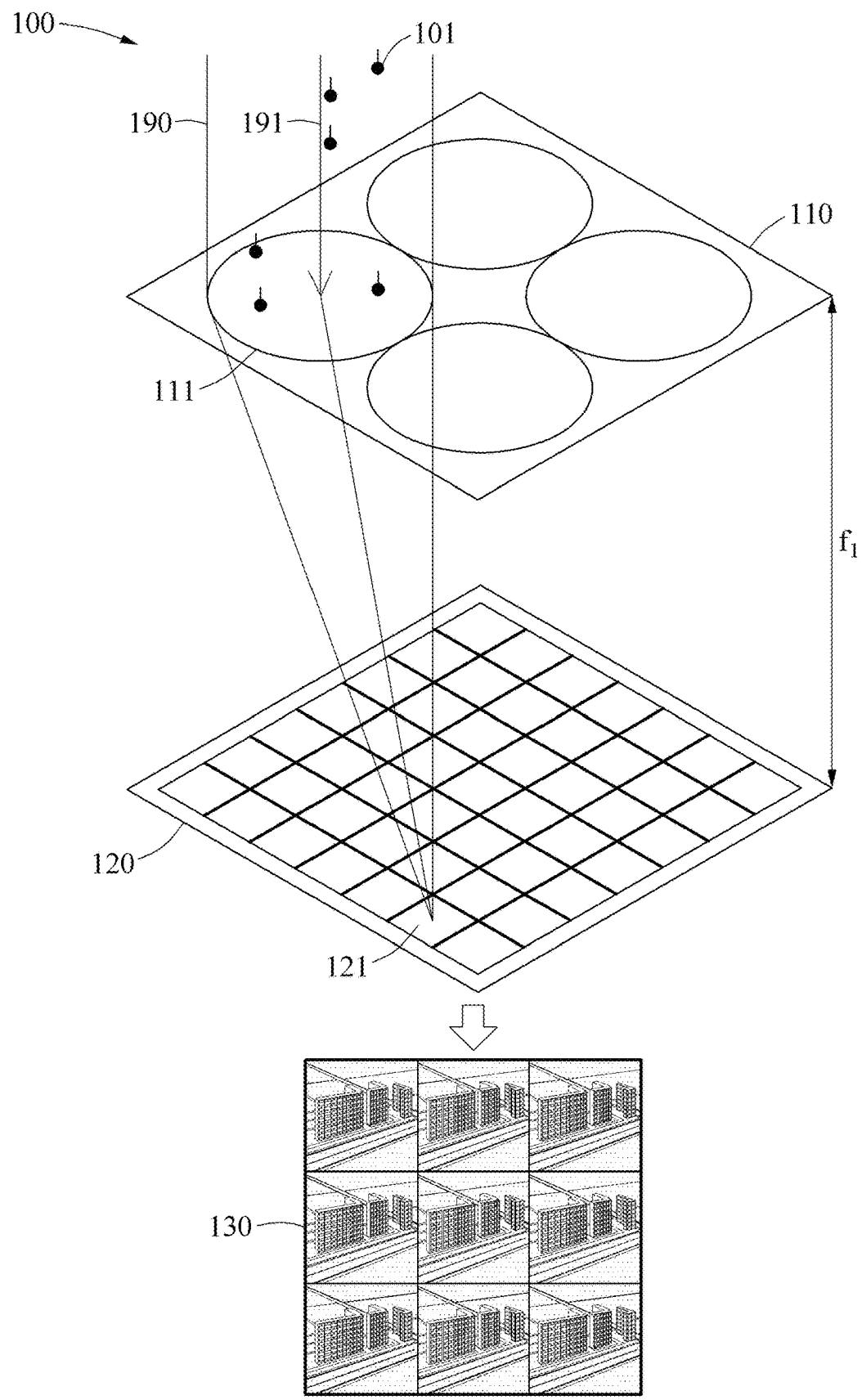
FIGS. 1, 2, and 3 illustrate an example of determining a target image according to example embodiments.

Example embodiments are described in detail below with reference to the accompanying drawings.

In the following description, like drawing reference numerals are used for like elements, even in different drawings. The matters defined in the description, such as detailed construction and elements, are provided to assist in a comprehensive understanding of example embodiments. However, it is apparent that example embodiments can be practiced without those specifically defined matters. Also, well-known functions or constructions are not described in detail since they would obscure the description with unnecessary detail.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of example embodiments.

Figure 2:
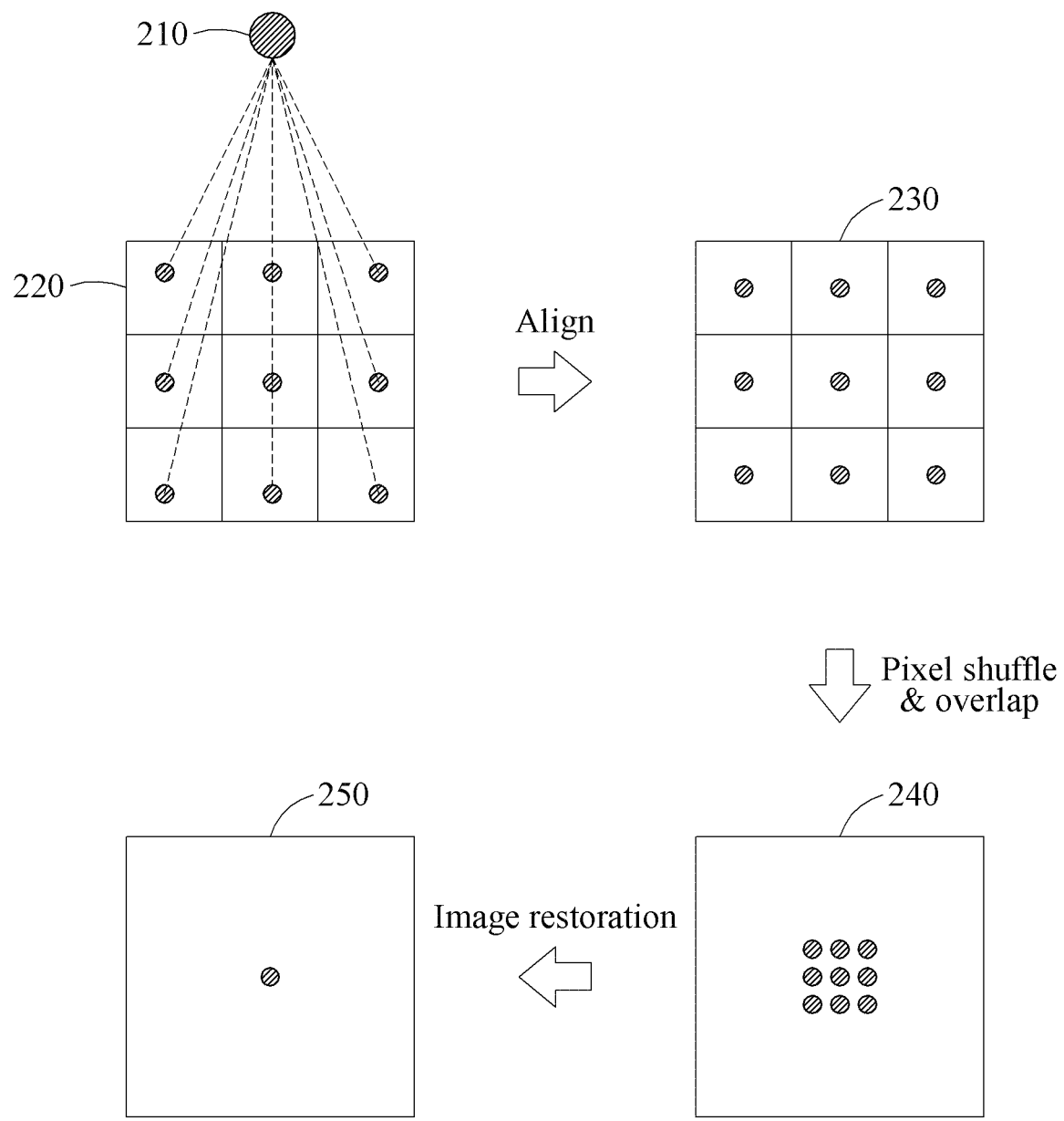
Figure 3:
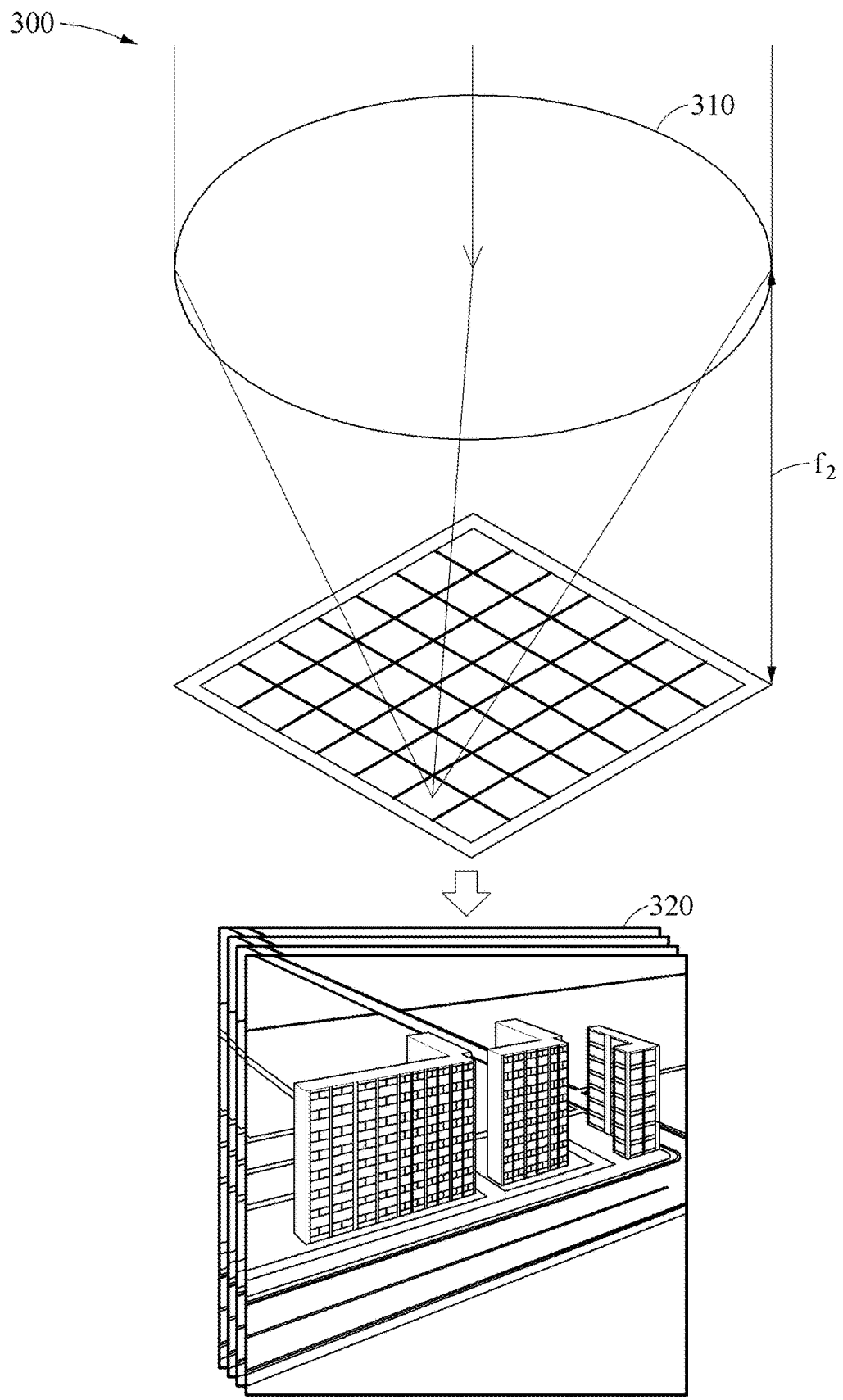

FIGS. 1, 2, and 3 illustrate an example of determining a target image according to an example embodiment.

Referring to FIG. 1, a camera 100 includes a lens array 110 and a sensing array 120. The camera 100 may capture a compound eye vision (CEV) image 130 based on the lens array 110. The quality of the CEV image 130 captured by the camera 100 may be determined based on the number of sensing elements included in the sensing array 120 and the amount of light incident on each sensing element (e.g., a sensing element 121) of the sensing array 120. For example, the resolution of the CEV image 130 may be determined by the number of sensing elements included in the sensing array 120, and the sensitivity of the CEV image 130 may be determined by the amount of light incident on the sensing element 121. The amount of light incident on the sensing element 121 may be determined based on the size of the sensing element 121. As the size of the sensing element 121 increases, the amount of light incident on the sensing element 121 may increase, and a dynamic range of the sensing array 120 may also increase. Thus, as the size of the sensing element 121 increases, the sensing array 120 may operate effectively in capturing a high-sensitive image even under a low illumination condition. Also, as the number of sensing elements included in the sensing array 120 increases, the sensing array 120 may capture a higher-resolution image.

The volume of the camera 100 may be determined based on a focal length $f_1$ of each lens element (e.g., a lens element 111) of the lens array 110. For example, the volume of the camera 100 may be determined by an interval between the lens element 111 and the sensing array 120. This is because, to collect light 190 refracted by the lens element 111, the sensing array 120 needs to be disposed by the focal length $f_1$ of the lens element 111, and thus the lens element 111 and the sensing array 120 need to be disposed separately from each other by the focal length $f_1$ of the lens element 111.

The focal length $f_1$ of the lens element 111 may be determined based on a viewing angle of the camera 100 and the size of the lens element 111. The size of the lens element 111 may correspond to, for example, a radius of an aperture of the lens element 111. For example, when the viewing angle is fixed, the focal length $f_1$ may increase in proportion to the size of the lens element 111. In addition, the size of the lens element 111 may be determined based on the size of the sensing array 120. For example, to capture an image in a certain viewing angle range, the size of the lens element 111 may need to increase as the size of the sensing array 120 increases.

As described above, to increase the sensitivity of an image while maintaining the viewing angle and the resolution of the image, the volume of the camera 100 may increase. For example, to increase the sensitivity of the image while maintaining the resolution of the image, the size of each sensing element (e.g., the sensing element 121) may need to increase while maintaining the number of sensing elements included in the sensing array 120, and the size of the sensing array 120 may thereby increase. In this example, to maintain the viewing angle, the size of the lens element 111 may increase as the size of the sensing array 120 increases, and the focal length $f_1$ of the lens element 111 may also increase. Thus, the volume of the camera 100 may increase.

As illustrated, the camera 100 includes the lens array 110 and the sensing array 120. The lens array 110 includes a plurality of lens elements, and the sensing array 120 includes a plurality of sensing elements. The lens elements may be arranged along a plane of the lens array 110, and the sensing elements may be arranged along a plane of the sensing array 120. The sensing elements of the sensing array 120 may be divided into sensing regions each corresponding to each of the lens elements. The plane of the lens array 110 may be parallel to the plane of the sensing array 120, and be separate from the plane of the sensing array 120 by the focal length $f_1$ of each lens element (e.g., the lens element 111) included in the lens array 110. The lens array 110 may also be referred to as a micro-multilens array (MMLA) or a multilens array.

According to an example embodiment, by decreasing the size of each lens element included in the lens array 110, that is, by increasing the number of lens elements included in the same area, the focal length $f_1$ of each lens element (e.g., the lens element 111) may decrease and the thickness of the camera 100 may also decrease. In such a case, the camera 100 may rearrange and combine the CEV image 130 corresponding to low-resolution images captured by the lens elements to restore an original high-resolution image. Thus, by dividing the lens elements included in the lens array 110, a thin camera may be provided.

An individual lens element, for example, the lens element 111, of the lens array 110 may cover a region in the sensing array 120 corresponding to the size of the lens element 111. The light 190 passing through the lens element 111 may be incident on sensing elements of the sensing array 120 included in the region. The light 190 may include a plurality of rays. A ray 191 may correspond to a flow of a photon 101. Each sensing element of the sensing array 120 may generate sensing information based on the ray 191 passing through the lens elements of the lens array 110. For example, the sensing element 121 may generate the sensing information based on the ray 191 passing through the lens element 111.

Based on the sensing information output from the sensing array 120, the camera 100 may determine color information (e.g., a color value) corresponding to an original color signal for points included in a viewing field of the camera 100, and restore a captured image based on the determined color information.

The sensing element 121 may include a color filter for sensing a color. The sensing element 121 may generate, as the sensing information, a color value corresponding to the color. Each sensing element included in the sensing array 120 may be arranged to sense a different color from a neighboring sensing element that is spatially adjacent to each sensing element.

Thus, a sufficient level of diversity of the sensing information may be obtained. Thus, when a full-rank relationship is established between the sensing information and original signal information corresponding to points included in the viewing field of the camera 100, a captured image corresponding to the highest resolution of the sensing array 120 may be obtained. The diversity of the sensing information may be obtained based on parameters of the camera 100, such as, for example, the number of lens elements included in the lens array 110 and the number of sensing elements included in the sensing array 120.

Referring to FIG. 2, when an image of an object 210 is captured through a camera of the structure described above, a CEV image 220 may be generated. The CEV image 220 may refer to an image captured overlappingly from the same object 210, as if observed through the compound eyes of an insect. For example, the camera may generate the CEV image 220 based on the intensity of light received by a plurality of sensing elements through a plurality of lens elements arranged in a form of an array. In the example of FIG. 2, the CEV image 220 may include nine low-resolution images, and the object 210 may be shown in each of the low-resolution images.

Based on the camera structure described above, a disparity may occur in the low-resolution images of the CEV image 220. For example, a low-resolution image at a center of the CEV image 220 may have the object 210 at or around its center, while a low-resolution image at an edge of the CEV image 220 may have the object 210 at or around its edge.

To remove such a disparity occurring even with respect to the same object 210 due to the camera structure, the CEV 220 may be aligned based on an alignment network. Thus, in an aligned image 230, the position of the object 210 may be relatively (or substantially) the same in each of the low-resolution images, compared to the CEV image 220.

By increasing the image size by applying a pixel shuffle to each of low-resolution images in the aligned image 230, and then overlapping the low-resolution images, an enlarged image 240 may be determined. However, the enlarged image 240 may still have a low resolution because it is enlarged from the low-resolution images, and thus the object 210 in the enlarged image 240 may not be sharply shown, and the enlarged image 240 may have various degradation elements. For example, multiple images may overlap in the enlarged image 240 or a blur may occur in the enlarged image 240.

By removing or reducing the degradation in the enlarged image 240 based on an image restoration network, a restored image 250 may be determined. For example, degradation occurring in the enlarged image 240 may be due to a lens aberration applied to the camera. Due to the lens aberration, the degradation may be more intensified from a center of the enlarged image 240 toward an edge of the enlarged image 240, and be symmetric based on a lens. For example, the degradation may have axial symmetry based on the lens. The degradation may be exhibited over a wide range of the enlarged image 240, and may thus require an image restoration network having a receptive field of a wide range. In addition to such degradation, the enlarged image 240 may also have various degradation elements depending on, for example, a camera structure or an image capturing environment. The restored image 250 may be a high-resolution image in which the degradation is reduced or removed. The enlarged image 240 may be a target for image restoration and thus be referred to herein as a target image.

Referring to FIG. 3, a camera 300 may capture a plurality of images 320 through a single lens 310. The single lens 310 may be greater in size than an individual lens element (e.g., the lens element 111) illustrated in FIG. 1, and have a greater focal length $f_2$, and thus the volume of the camera 300 may be greater than the volume of the camera 100 in FIG. 1. A single image may be generated through one-time capturing using the single lens 310. A plurality of images (e.g., the images 320) from different viewing points may be generated by capturing the same scene successively using the single lens 310. However, even by fast capturing the same scene successively, information included in the images 320 may slightly change due to a subtle movement of the camera 300 or a movement of an object in the scene, and thus degradation such as a blur may occur in an image determined by overlapping the images 320. For example, degradation occurring due to the subtle movement of the camera 300 may be exhibited over a wide range of the image because the entire scene captured by the camera 300 is shaken due to the movement of the camera 300, and may thus require an image restoration network having a receptive field of a wide range. The image determined by overlapping the images 320 may be a target for image restoration and thus be referred to herein as a target image.

The following examples described hereinafter relate to obtaining a restored image corresponding to a target image through an image restoration network.

Figure 4:
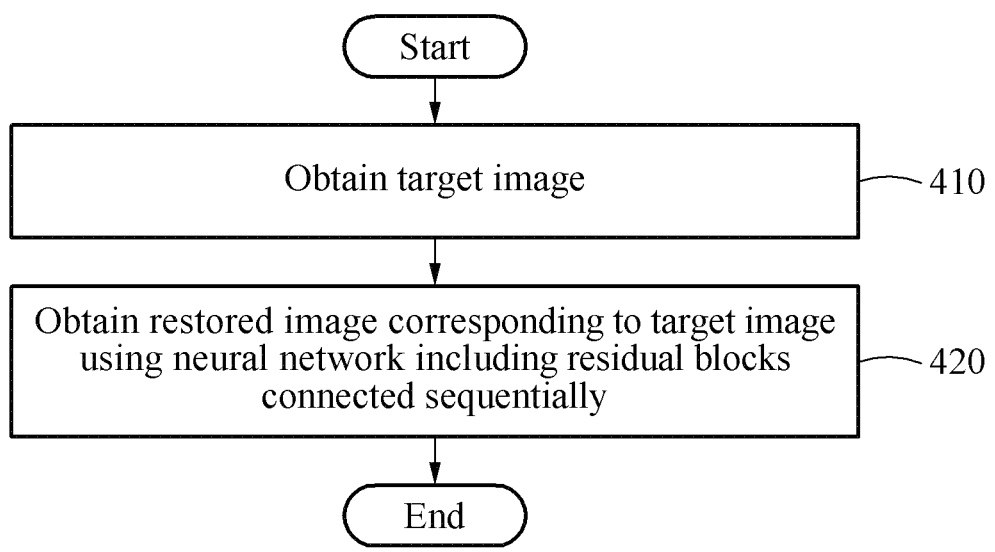
FIG. 4 illustrates a flowchart of an example of an image processing method according to an example embodiment.

FIG. 4 illustrates a flowchart of an example of an image processing method according to an example embodiment.

The image processing method described hereinafter with reference to FIG. 4 may be performed by a processor of an image processing apparatus using a neural network.

Referring to FIG. 4, in operation 410, the image processing apparatus obtains a target image. For example, the image processing apparatus may obtain the target image based on an image captured by an embedded camera module or an external camera device. The target image may be at least one low-resolution image in which a degradation occurs and may include, for example, the enlarged image 240 of FIG. 2 and/or the image determined by overlapping the images 320 of FIG. 3. However, the target image is not limited to the enlarged image 240 and/or the determined image 320, and may include any image that includes degradation.

In operation 420, the image processing apparatus obtains a restored image corresponding to the target image using a neural network, which may include a plurality of residual blocks connected sequentially. The neural network including the residual blocks will be described in detail with reference to FIGS. 5 through 9.

FIGS. 5 through 10 illustrate examples of an image processing model according to an example embodiment.

Figure 5:
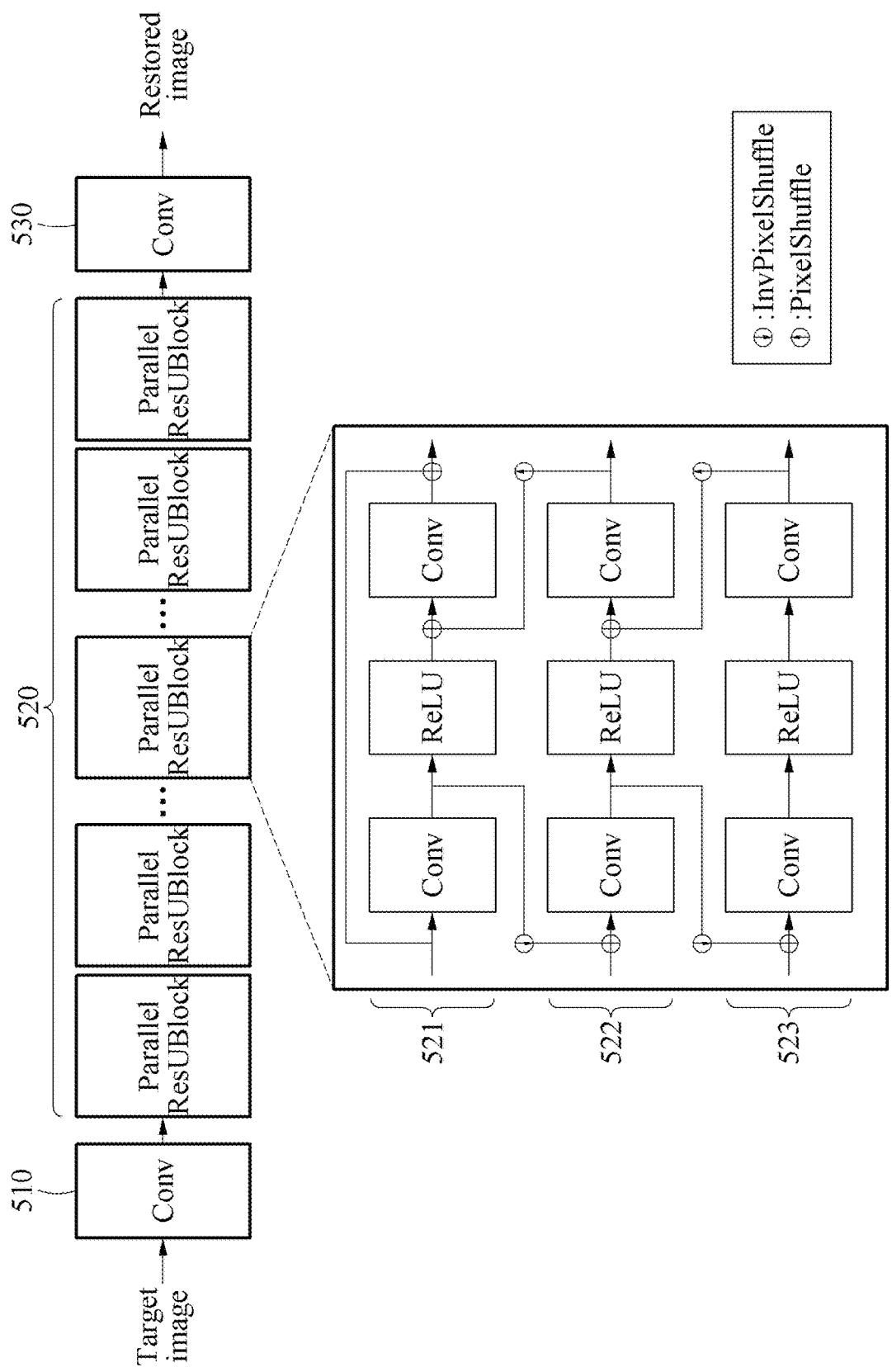
FIGS. 5, 6, 7, 8, 9, and 10 illustrate examples of an image processing model according to example embodiments.

Referring to FIG. 5, a neural network includes convolution layers 510 and 530 and a plurality of residual blocks 520. In the example of FIG. 5, the residual blocks 520 are connected in series between the convolution layers 510 and 530.

The convolution layer 510 may collect and/or process image information from a target image and transfer a result of the collecting and/or the processing to a first residual block of the residual blocks 520. The convolution layer 530 may determine a restored image based on an image processing result received from a last residual block of the residual blocks 520.

Each residual block may gradually restore an image by gradually removing or reducing degradation in an image transferred from a previous residual block. Each residual block may perform image processing, or image restoration, on an image input from a previous residual block on different scales and transfer results of the image processing to a subsequent residual block. Although the scales are illustrated as being classified by three levels 521, 522, and 523 in FIG. 5 for the convenience of description, the number of different scales is not limited to the illustrated example.

At each of the levels 521, 522, and 523, two convolution layers and an activation function layer disposed therebetween may be used for image processing. A first convolution layer of the two convolution layers may collect and/or process image information from a received image and transfer a result of the collecting and/or the processing to the activation function layer. The activation function layer may filter out unnecessary or insignificant information from the received information. Although a rectified linear unit (ReLU) layer is illustrated as an example of the activation function layer in FIG. 5, other various activation function layers, such as, for example, a leaky ReLU layer, a parametric ReLU (PReLU) layer, a sigmoid layer, a softmax layer, and a hyperbolic tangent layer, may be employed. A last convolution layer of the two convolution layers may represent, as an image, the received information passing through the filtering and output the image. For example, the output image may correspond to high-frequency information of an image input to the first level 521. At the first level 521, through an internal skip-connection, an image (e.g., a blurred image) input to the first level 521 may be combined with, or added to, the image output from the last convolution layer, and thus degradation (e.g., a blur) included in the image may be reduced.

The operations of the two convolution layers disposed at each of the levels 521, 522, and 523 will be described in detail with reference to FIG. 6. A model-based deblurring problem may be represented as follows.

$$\min_x \|y - k * x\|_F^2 + \lambda \|\nabla * x\|_F^2 \qquad [\text{Equation 1}]$$

In Equation 1, k denotes a blur filter, and ∇ denotes a horizontal and vertical-direction gradient filter that is represented as, for example, [1, −1], [1; −1], or a high-frequency filter of another type. x denotes a ground truth image, and k*x denotes a blurred image. y denotes an input image, and F denotes a Frobenius norm. This problem may be solved based on a gradient descent, which may be represented as follows.

$$x_{n+1} = x_n - \alpha(k^T * (k * x_n - y) + \lambda \nabla^T * \nabla * x_n) = \qquad [\text{Equation 2}]$$
$$x_n - \alpha((k^T * k + \lambda \nabla^T * \nabla) * x_n - k^T * y)$$

In Equation 2, $x_n$ denotes an inferred image in a current step, and $x_{n+1}$ denotes an inferred image in a subsequent step. λ and α denote a weight. The deblurring problem may be substituted by calculating a weighted sum of a result obtained from a convolution on the image $x_n$ in the current step with k and $k^T$ sequentially and a result obtained from a convolution on the image $x_n$ in the current step with $\nabla$ and $\nabla^T$ sequentially, and adding a bias.

Figure 6:
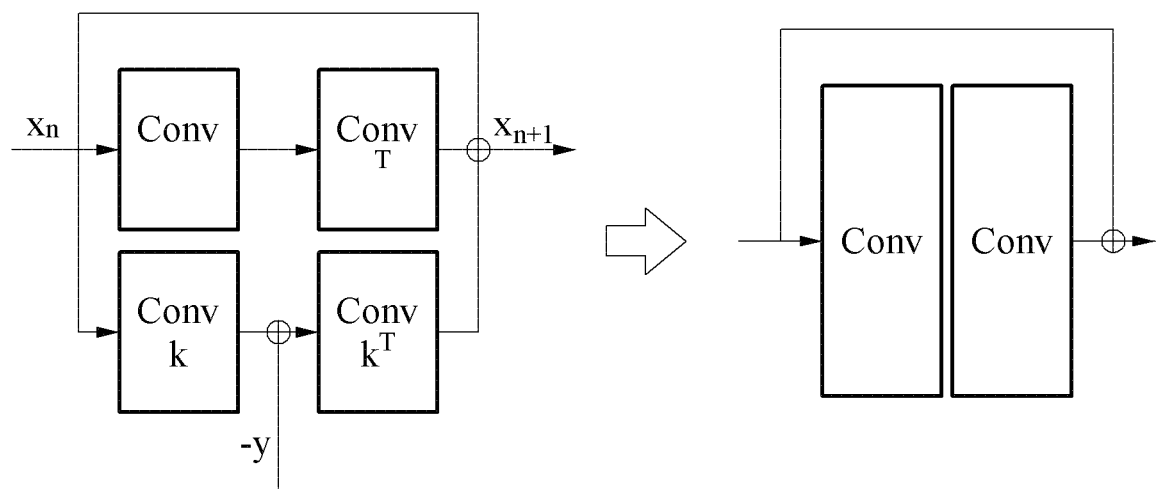

Equation 2 may be illustrated as a left diagram of FIG. 6, which is generalized to be a simplified form as shown in a right diagram of FIG. 6. For example, each of the simplified two convolution layers may include 64 kernels for extracting feature data from an image. One step of the gradient descent represented by Equation 2 may be represented by two convolution layers.

Referring back to FIG. 5, the levels 521, 522, and 523 in a residual block may have different scales each indicating the size of a range to be referred to when performing image processing. For example, at the first level 521, the image processing may be performed on a first scale that refers to a region of a first range of an input image. At the second level 522, the image processing may be performed on a second scale that refers to a region of a second range greater than the first range of the input image. At the third level 523, the image processing may be performed on a third scale that refers to a region of a third range greater than the second range of the input image. The kernel size of a convolution layer disposed at each of the levels 521, 522, and 523 is the same, but the size of a region to be referred to when performing the image processing is different. This is because, when an image is transferred from the first level 521 to the second level 522, an inverse pixel shuffle is performed.

Figure 7:
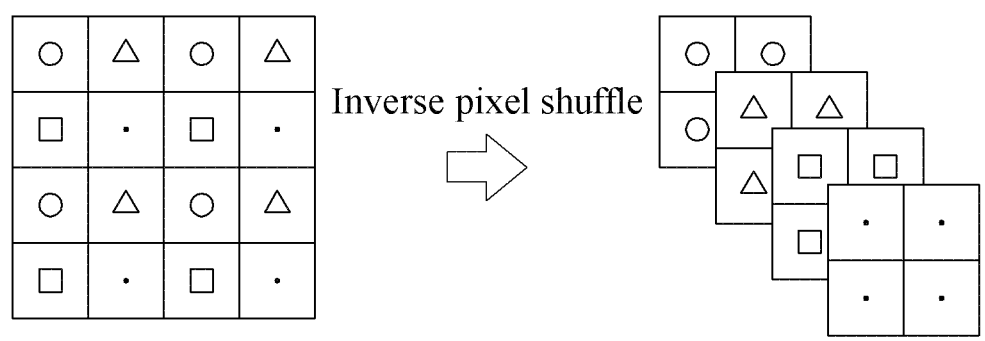

The inverse pixel shuffle will be described in detail with reference to FIG. 7. Referring to FIG. 7, for example, a 4×4 image of channel 1 may be transformed into a 2×2 image of channel 4 through the inverse pixel shuffle. In this example, pixels not adjacent to each other in the 4×4 image of channel 1 may be arranged to be adjacent to each other in an image in the same channel. Through a 2×2 convolution, sets of image information that are not referred to in the 4×4 image of channel 1 may be referred to in the 2×2 image of channel 4. That is, by performing the inverse pixel shuffle without increasing a convolution size, it is possible to perform image processing by referring to image information that is not referred to through an existing convolution size. Accordingly, it is possible to prevent an operation amount or a computational amount from considerably increasing when increasing the convolution size to refer to remote information in an image. The number of channels increased by the inverse pixel shuffle may be reduced through a convolution to be performed subsequently.

Referring back to FIG. 5, an image obtained through the inverse pixel shuffle may be combined with, or added to, an image of a second scale that is transferred from a previous residual block. The image transferred from the previous residual block may be a result of image processing performed on the second scale in the previous residual block, and thus have the same size as an image obtained through the inverse pixel shuffle after being transferred from the first level 521. Here, corresponding pixel values of the two images may be added to each other. In this manner, it is possible to prevent redundant operations, reutilize previous block information, and prevent a bottleneck phenomenon that may occur in a portion of a network as image information is transferred from various levels. The image obtained through the inverse pixel shuffle after being transferred from the first level 521 and the image of the second scale transferred from the previous residual block may be used for image processing or image restoration that refers to a region of the second range according to the second scale. The image processing performed on the second scale at the second level 522 may have a wider range to be referred to compared to the first scale, and thus may effectively remove or reduce degradation over a wider range of an image. A result of the image processing performed on the second scale may be transferred to a subsequent residual block and used for image processing to be performed on the second scale in the subsequent residual block.

In addition, the result of the image processing performed on the second scale may be transferred to the first level 521 after undergoing a pixel shuffle and then be used for image processing to be performed on the first scale.

The result of the image processing performed on the second scale may be transferred to the third level 523 after undergoing the inverse pixel shuffle and then be used for the image processing to be performed on a third scale. The image processing to be performed on the third scale at the third level 523 may be performed in the manner same as described above, and thus detailed description thereof will be omitted for brevity.

As each of the levels 521, 522, and 523 in a residual block is in a U-shaped parallel connection form, the residual block may thus be referred to as a parallel residual U block. The residual blocks 520 of such a structure are connected sequentially, and it is thus possible to improve an image restoration performance by referring to image information of various scales in various steps of the entire image processing for obtaining a restored image from a target image.

In the example of FIG. 5, it is described that the addition of images may be performed after the inverse pixel shuffle or the pixel shuffle is performed when an image is transferred to another level. However, the disclosure is not limited to this example and the order of the operations may change depending on example embodiments. For another example, an image transferred from the first level 521 to the second level 522 may be added to an image transferred from a previous residual block and the inverse pixel shuffle may then be performed thereon. Similarly, the pixel shuffle may be first applied to an image output from a last convolution layer of the second level 522, and then a resultant image obtained therefrom may be transferred to the first level 521 and a subsequent residual block.

The scales classified by the three levels 521, 522, and 523 in the example of FIG. 5 may vary depending on a situation. The number of different scales, or the number of levels, to be applied to each residual block may be determined such that degradation elements of various sizes included in a target image are removed or reduced through the different scales based on the levels. For example, the number of different scales may be determined based on the size of potential degradation occurring in the target image, the size of a convolution kernel used for image processing, and a degree of a difference in the scales (that is, a degree of a scale that changes as a level changes). For example, in a case in which the size of potential degradation that may occur in the target image is 121×121, the size of the convolution kernel is 5×5, and the degree of the difference in scales is quintuple, the number of different scales may be determined to be three such that a first level has a scale with the size of 5×5, a second level has a scale with the size of 25×25, and a third level has a scale with the size of 125×125, thereby removing or reducing the potential degradation on various scales. For another example, in a case in which the potential degradation occurring in the target image is due to a physical element of a lens, for example, a lens aberration, the size of the potential degradation that may occur in the target image may be determined based on lens information.

Figure 8:
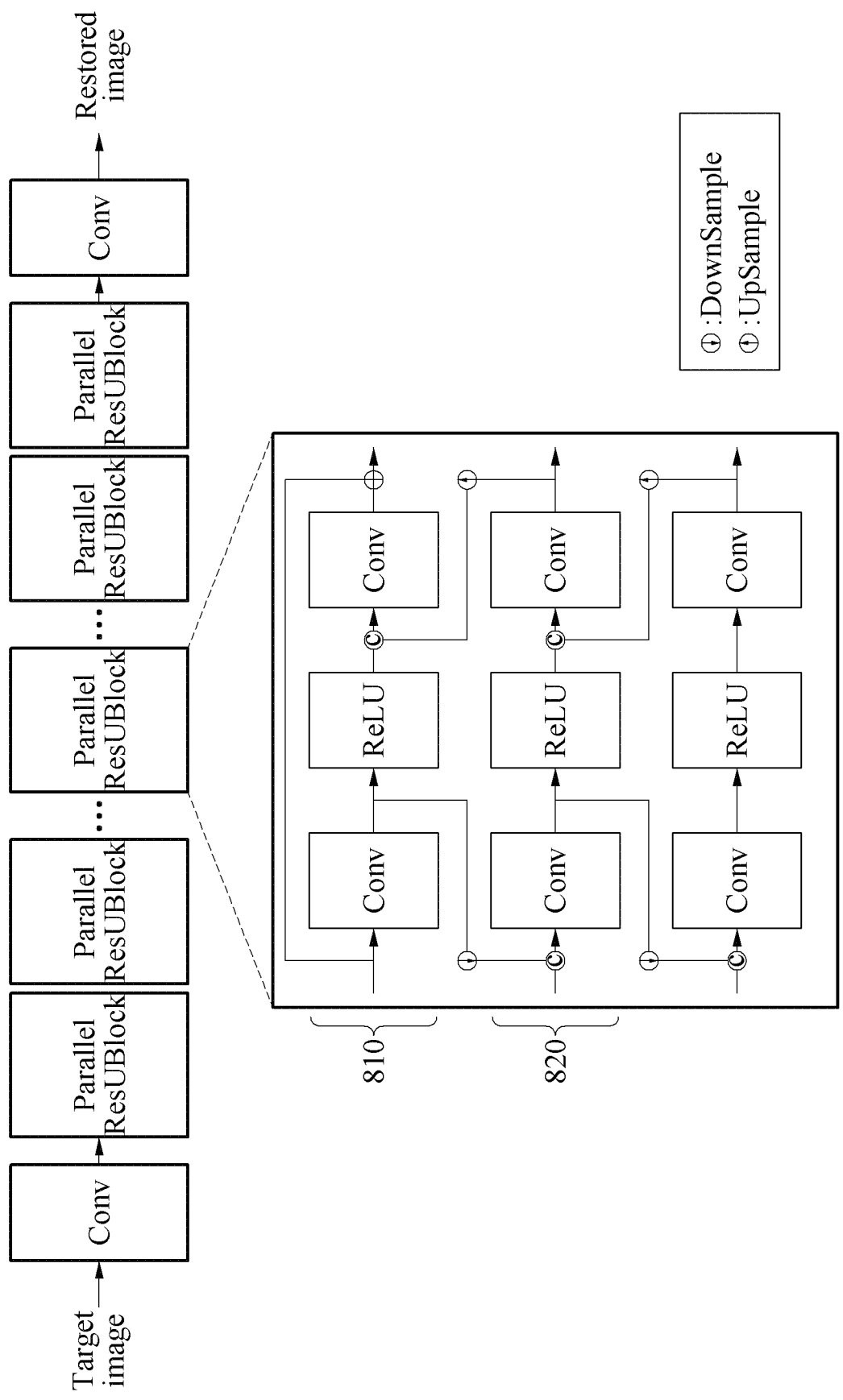

FIG. 8 illustrates another example of a plurality of residual blocks. The inverse pixel shuffle or the pixel shuffle that is performed when an image is transferred to another level in a residual block as described above with reference to FIG. 5 may be replaced with downsampling or upsampling, respectively. The downsampling may refer to an operation of reducing an image by sampling some values of the image and include, for example, average pooling and max pooling. The upsampling may refer to an operation of enlarging an image by increasing a value included in the image and include, for example, bilinear interpolation and nearest interpolation.

In addition, the operation of combining or adding an image obtained through the inverse pixel shuffle or the pixel shuffle with or to an image transferred from a previous residual block or an image processed at a corresponding level, which is described above with reference to FIG. 5, may be replaced with a concatenation operator. The concatenation operator may refer to an operator for concatenating two images which are targets for an operation such that the number of channels increases. The concatenation operator is indicated by Ⓒ in FIG. 8. For example, in a case in which each of the two images has 32 channels, an image obtained by concatenating the two images may have a total of 64 channels. On the other hand, in an image addition (or sum) operator described above with reference to FIG. 5, corresponding pixel values are added while the number of channels is maintained. The image with the channels increased by the concatenation operator may have the number of channels that is reduced to an original number of channels in a first convolution layer at a corresponding level, and image post-processing may thus be applied.

In the example of FIG. 8, it is described that when an image is transferred to another level, image concatenation may be performed after the downsampling or the upsampling. However, the disclosure is not limited to this example and the order of the operations may change depending on examples. For example, an image transferred from a first level 810 to a second level 820 may be concatenated with an image transferred from a previous residual block and then be downsampled. Similarly, upsampling may be first applied to an image output from a last convolution layer at the second level 820, and then a resultant image obtained therefrom may be transferred to the first level 810 and a subsequent residual block.

Figure 9:
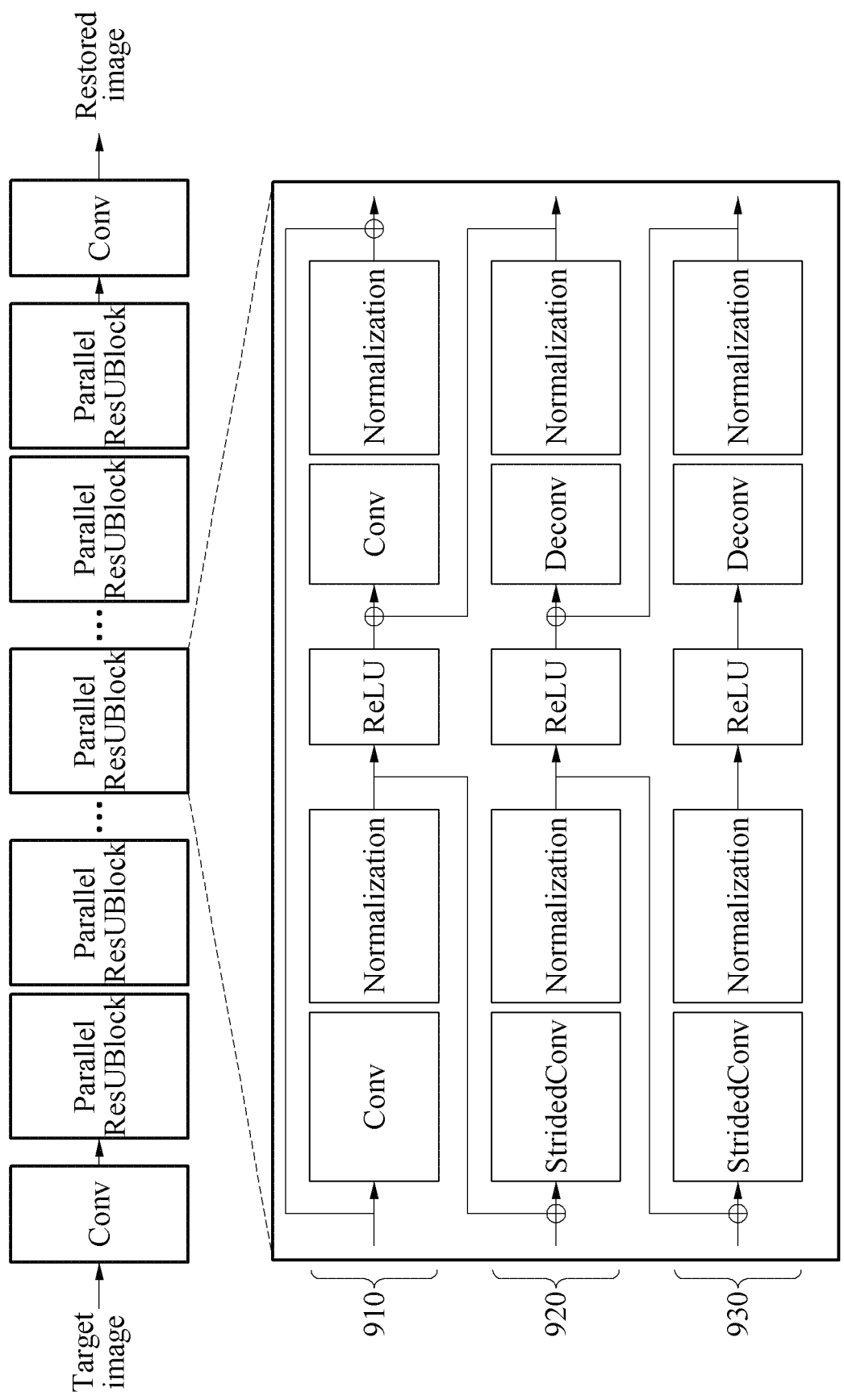

FIG. 9 illustrates another example of a plurality of residual blocks. The inverse pixel shuffle and a convolution layer included in each level, which are described above with reference to FIG. 5, may be replaced with a strided convolution layer in the example of FIG. 9. In addition, the pixel shuffle and the convolution layer described above with reference to FIG. 5 may be replaced with a deconvolution layer in the example of FIG. 9. At each of levels 910, 920, and 930, a normalization layer may be arranged after a convolution layer, the strided convolution layer, and/or the deconvolution layer. The normalization layer may be based on channel attention, self-attention, batch normalization, drop-out, a linear scale, a spatial feature transform (SFT) layer, and the like.

Figure 10:
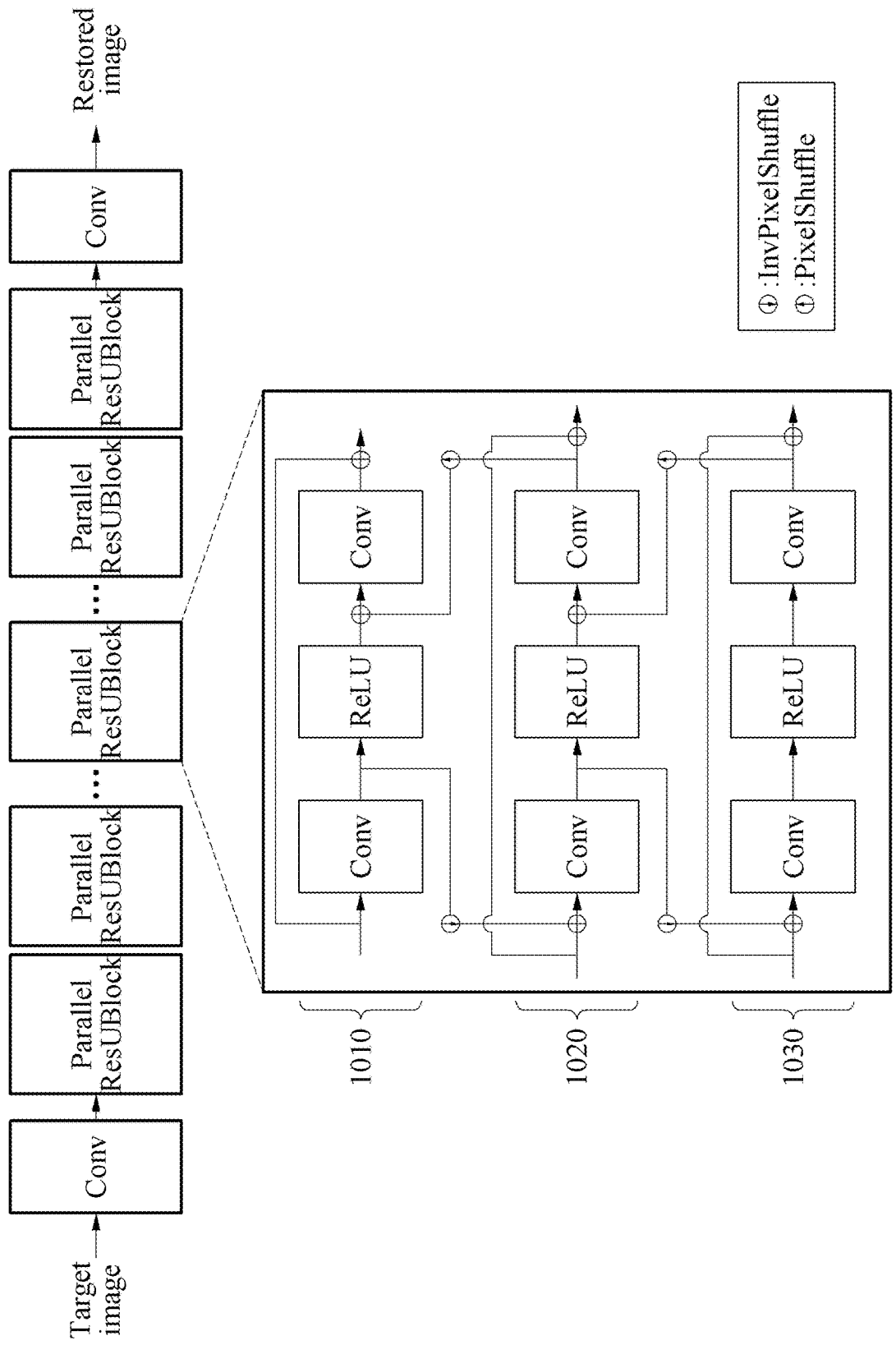

FIG. 10 illustrates another example of a plurality of residual blocks. While the internal skip connection is arranged only at the first level 521 in the example of FIG. 5, the internal skip connection may be arranged at all levels 1010, 1020, and 1030 in the example of FIG. 10. The internal skip connection may be used for image processing on various scales.

Figure 11:
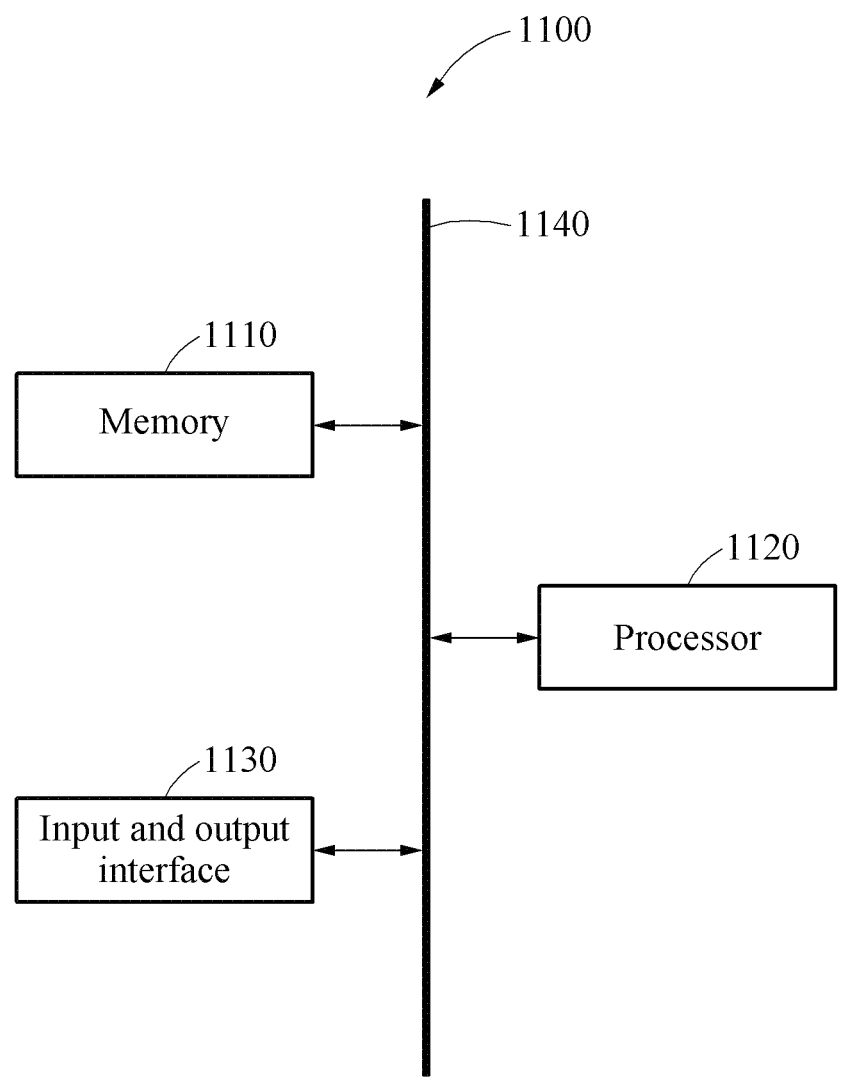
FIG. 11 illustrates an example of an image processing apparatus according to an example embodiment.

FIG. 11 illustrates an example of an image processing apparatus according to an example embodiment.

Referring to FIG. 11, an image processing apparatus 1100 includes a memory 1110, a processor 1120, and an input and output interface 1130. The memory 1110, the processor 1120, and the input and output interface 1130 may communicate with one another through a bus 1140.

The processor 1110 may include a computer-readable instruction. When the instruction stored in the memory 1110 is executed by the processor 1120, the processor 1120 may perform the operations described above. The memory 1110 may include a volatile memory and/or a nonvolatile memory.

The processor 1120 may be a device configured to execute instructions or programs, or control the image processing apparatus 1100, and include a central processing unit (CPU), a graphics processing unit (GPU), a neural processing unit (NPU), and a digital signal processor (DSP), for example. However, examples of the processor 1120 included in the image processing apparatus 1100 are not limited to the foregoing examples. The image processing apparatus 1100 may be connected to an external device (e.g., a camera device or a database in which images are stored) through the input and output interface 1130 and exchange data (e.g., a target image) with the external device. Alternatively, the image processing apparatus 1100 may receive a target image based on an image captured by an internal camera module (not shown). In such a case, the processor 1120 may obtain the target image, and obtain a restored image corresponding to the target image using a neural network including a plurality of residual blocks connected sequentially.

The image processing apparatus 1100 may be provided as, for example but not limited to, a computing device (e.g., a smartphone, a personal computer (PC), a tablet PC, a laptop, etc.), a wearable device (e.g., a smart watch, smart glasses, smart clothes, etc.), a home appliance (e.g., a smart speaker, a smart television (TV), a smart refrigerator, etc.), or another type of a computing device (e.g., a smart vehicle, a smart kiosk, an Internet of things (IoT) device, a walking assist device (WAD), a drone, a robot, etc.).

The image processing apparatus 1100 may restore an image by referring to information that is spatially remote in an image in such cases as where a level of degradation (e.g., a blur) is high (or severe) or a super-resolution scale is high. The image processing apparatus 1100 may also process the operations described above.

Figure 12:
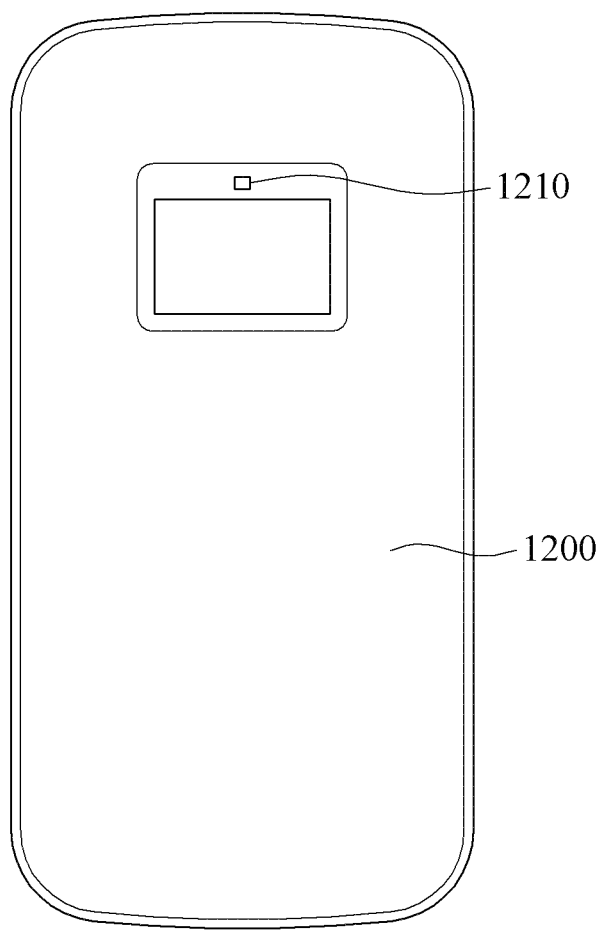
FIGS. 12 and 13 illustrate examples of implementation of an image processing apparatus according to example embodiments.
Figure 13:
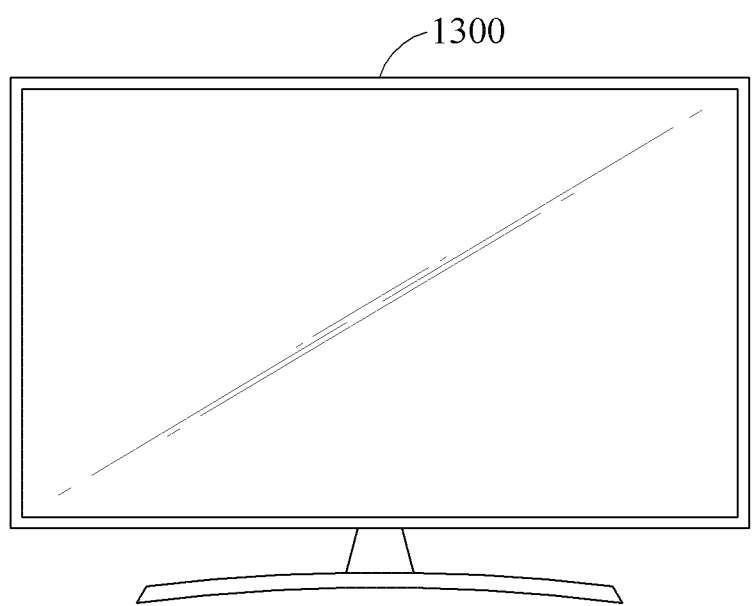

FIGS. 12 and 13 illustrate examples of implementation of an image processing apparatus according to example embodiments.

An image processing apparatus according to example embodiments may be applicable to various technical fields. For example, the image processing apparatus according to example embodiments may be designed such that a lens array including a plurality of lens elements and a sensor including a plurality of sensing elements are separated from each other by a relatively short focal length. Thus, the image processing apparatus may be provided as an ultra-thin camera having a relatively large sensor for capturing a high-resolution image. The image processing apparatus may have a reduced thickness based on a structure of a multilens array. The image processing apparatus may also be provided as an image signal processor of a camera and provided as an application processor (AP), a field programmable gate array (FPGA), a chip, and the like. The image processing apparatus may be applied to a front camera or a rear camera of a smartphone. In such a case, the image processing apparatus may be applied to a mobile phone camera as being in a structure in which a large full-frame sensor and a micro-lens array are combined. The image processing apparatus may also be provided in a thin-film structure or a curved structure for a vehicle.

For example, as illustrated in FIG. 12, an image processing apparatus 1210 may be provided as a rear camera of a smartphone 1200. In this example, a sensor of the image processing apparatus 1210 may be provided as a full frame, and a lens array thereof may be provided as a micro-lens.

The image processing apparatus according to example embodiments may be used for a digital single-lens reflex (DSLR) camera, a vehicle, a drone, a closed-circuit television (CCTV) camera, a webcam camera, a 360-degree camera, a camera for filming and broadcasting, a virtual reality/augmented reality (VR/AR) camera, and the like. The image processing apparatus may also be applicable to various fields including, for example, a flexible or stretchable camera, an insect-eye camera, a contact lens-type camera, and the like.

Further, the image processing apparatus according to example embodiments may be applicable to multi-frame super-resolution image restoration that increases a resolution using frame information of a plurality of captured successive frames of a video image.

For another example, as illustrated in FIG. 13, an image processing apparatus 1300 may be used in an image display device (e.g., a smart TV, a smartphone, a PC, etc.) and a device (e.g., a digital optical disc (DVD) or Blue-ray disc player) that plays or displays a captured image.

The units described herein may be implemented using hardware components, software components, or any combination thereof. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is made as singular; however, one skilled in the art would understand that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or any combination thereof, to independently or collectively instruct or configure the processing device to operate as desired. Software and data may be provided permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations performed by a computer. The media may also include, alone or in combination with the program instructions, data files, data structures, tables, and the like. The media and program instructions may be specially designed and constructed for the purposes of example embodiments, or they may be known and available to those having skill in the computer software arts. Examples of non-transitory computer-readable media include magnetic media such as hard disks, floppy disks, and magnetic tape; optical media such as compact disk read-only memory (CD ROM); magneto-optical media such as floptical disks; and hardware devices that are specially configured to store and perform program instructions, such as read-only memory (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

While the disclosure has been particularly shown and described with reference to embodiments thereof, it will be understood that various changes in form and details may be made therein without departing from the spirit and scope of the following claims and their equivalents.

What is claimed is:

1. A method for processing an image by using a neural network, the method being performed by using at least one processor and comprising:

obtaining a target image; and obtaining a restored image corresponding to the target image by using the neural network, the neural network including a plurality of residual blocks connected sequentially, wherein the obtaining the restored image comprises obtaining the restored image by performing, in each residual block of the plurality of residual blocks, image processing on an input image, which is input from a previous residual block, on different scales, and providing results of the image processing performed on the different scales to a subsequent residual block, wherein a number of the different scales applied to each residual block of the plurality of residual blocks is determined based on a size of a potential degradation in the target image, a size of a convolution kernel used for the image processing, and a degree of a difference between the different scales, and wherein the size of the potential degradation is a spatial size of the potential degradation included in the target image.

2. The method of claim 1, wherein the providing the results of the image processing comprises providing a result of image processing, performed on a corresponding scale in each residual block of the plurality of residual blocks, through a skip connection that is connected to the subsequent residual block on the corresponding scale, and wherein a result of image processing performed on each scale is used for image processing to be performed on a corresponding scale in the subsequent residual block.

3. The method of claim 1, wherein the performing the image processing comprises gradually restoring, in each residual block of the plurality of residual blocks, the input image using the input image and the results of the image processing performed on the different scales.

4. The method of claim 1, wherein, for image processing to be performed on a first scale that refers to a region of a first range of the input image, a result of image processing performed on a second scale that refers to a region of a second range greater than the first range is used.

5. The method of claim 4, wherein a pixel shuffle or upsampling is performed on the result of the image processing performed on the second scale and a result of the pixel shuffle or the upsampling is used for the image processing to be performed on the first scale.

6. The method of claim 4, wherein the image processing is performed on the second scale based on a result obtained by performing an inverse pixel shuffle or downsampling on an image to which the image processing on the first scale is to be applied.

7. The method of claim 1, wherein the obtaining the restored image further comprises performing, in each residual block of the plurality of residual blocks, a normalization operation on a result of a convolution operation in image processing performed on each scale.

8. The method of claim 1, wherein a result of image processing performed on each scale is provided to the subsequent residual block along with the input image to which the image processing on each scale is not applied, to be used for image processing to be performed on a corresponding scale in the subsequent residual block.

9. The method of claim 1, wherein the target image corresponds to at least one low-resolution image in which degradation occurs, and
wherein the restored image is a high-resolution image in which the degradation is reduced.

10. The method of claim 1, wherein the obtaining the target image comprises determining the target image based on a plurality of images captured through a multilens array or a plurality of images captured plural times through a single lens.

11. A non-transitory computer-readable storage medium storing instructions that are executable by a processor to perform the method of claim 1.

12. An apparatus for processing an image, the apparatus comprising:
at least one processor configured to obtain a target image, and obtain a restored image corresponding to the target image by using a neural network, the neural network including a plurality of residual blocks connected sequentially,
wherein each residual block of the plurality of residual blocks is configured to perform image processing on an input image, which is input from a previous residual block, on different scales, and provide results of the image processing performed on the different scales to a subsequent residual block,
wherein a number of the different scales applied to each residual block of the plurality of residual blocks is determined based on a size of a potential degradation in the target image, a size of a convolution kernel used for the image processing, and a degree of a difference between the different scales, and
wherein the size of the potential degradation is a spatial size of the potential degradation included in the target image.

13. The apparatus of claim 12, wherein each residual block of the plurality of residual blocks is configured to provide a result of image processing performed on a corresponding scale through a skip connection that is connected to the subsequent residual block on the corresponding scale, and
wherein a result of image processing performed on each scale is used for image processing to be performed on a corresponding scale in the subsequent residual block.

14. The apparatus of claim 12, wherein each residual block of the plurality of residual blocks is configured to gradually restore the input image using the input image and the results of the image processing performed on the different scales.

15. The apparatus of claim 12, wherein each residual block of the plurality of residual blocks is configured to use, for image processing to be performed on a first scale that refers to a region of a first range of the input image, a result of image processing performed on a second scale that refers to a region of a second range greater than the first range.

16. The apparatus of claim 12, wherein each residual block of the plurality of residual blocks is configured to perform a normalization operation on a result of a convolution operation in image processing performed on each scale.

17. The apparatus of claim 12, wherein each residual block of the plurality of residual blocks is configured to provide, to the subsequent residual block, a result of image processing performed on each scale and the input image to which the image processing on each scale is not applied, to be used for image processing to be performed on a corresponding scale in the subsequent residual block.

18. The apparatus of claim 12, wherein the target image is an image in which a plurality of images captured through a multilens array or a plurality of images captured plural times through a single lens is arranged.

* * * * *